United States Patent
Derclaye et al.

(10) Patent No.: US 8,348,619 B2
(45) Date of Patent: Jan. 8, 2013

(54) PLATFORM AND BLADE FOR A BLADED WHEEL OF A TURBOMACHINE, BLADED WHEEL AND COMPRESSOR OR TURBOMACHINE COMPRISING SUCH A BLADED WHEEL

(75) Inventors: Alain Derclaye, Couthuin (BE); Philippe Ernst, Eupen (BE)

(73) Assignee: Techspace Aero, Milmort Herstal (BE)

( * ) Notice: Subject to any disclaimer, the term of this patent is extended or adjusted under 35 U.S.C. 154(b) by 1049 days.

(21) Appl. No.: 12/343,669

(22) Filed: Dec. 24, 2008

(65) Prior Publication Data

US 2009/0180886 A1    Jul. 16, 2009

(30) Foreign Application Priority Data

Dec. 27, 2007    (EP) ..................................... 07150436

(51) Int. Cl.
*F01D 5/30*    (2006.01)
(52) U.S. Cl. ................ 416/215; 416/219 R; 416/193 A; 416/218; 416/95; 416/220 R
(58) Field of Classification Search .................. 419/215, 419/219 R, 193 A, 218, 95, 220 R
See application file for complete search history.

(56) References Cited

U.S. PATENT DOCUMENTS

| 3,393,862 A | | 7/1968 | Harrison | |
|---|---|---|---|---|
| 3,972,645 A | * | 8/1976 | Kasprow | ....................... 416/215 |

FOREIGN PATENT DOCUMENTS

| DE | 7225964 | 8/1973 |
|---|---|---|
| EP | 0 441 424 A1 | 8/1991 |
| EP | 0 524 876 A1 | 1/1993 |
| FR | 2 715 968 A1 | 8/1995 |
| GB | 9278 | 0/1909 |

* cited by examiner

*Primary Examiner* — Junghwa M Im
(74) *Attorney, Agent, or Firm* — Oblon, Spivak, McClelland, Maier & Neustadt, L.L.P.

(57) ABSTRACT

A platform for a bladed wheel of a turbomachine including a drum and blades of hammer-head attachment type, the foot of which is retained in a circumferential groove of the drum, having bearing and/or retaining faces cooperating with the drum is disclosed. The platform includes at least two openings spaced apart circumferentially and each able to receive the foot of a blade, whereby it constitutes a multiple-blade platform in the form of a piece separate from the blades.

11 Claims, 4 Drawing Sheets

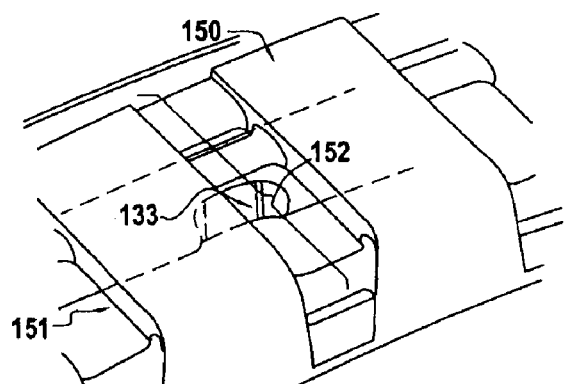
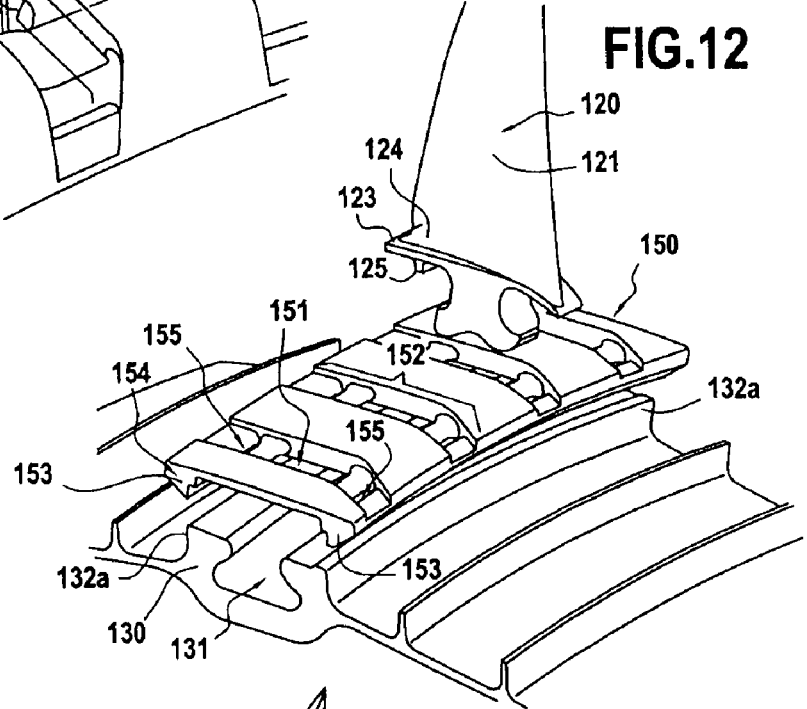
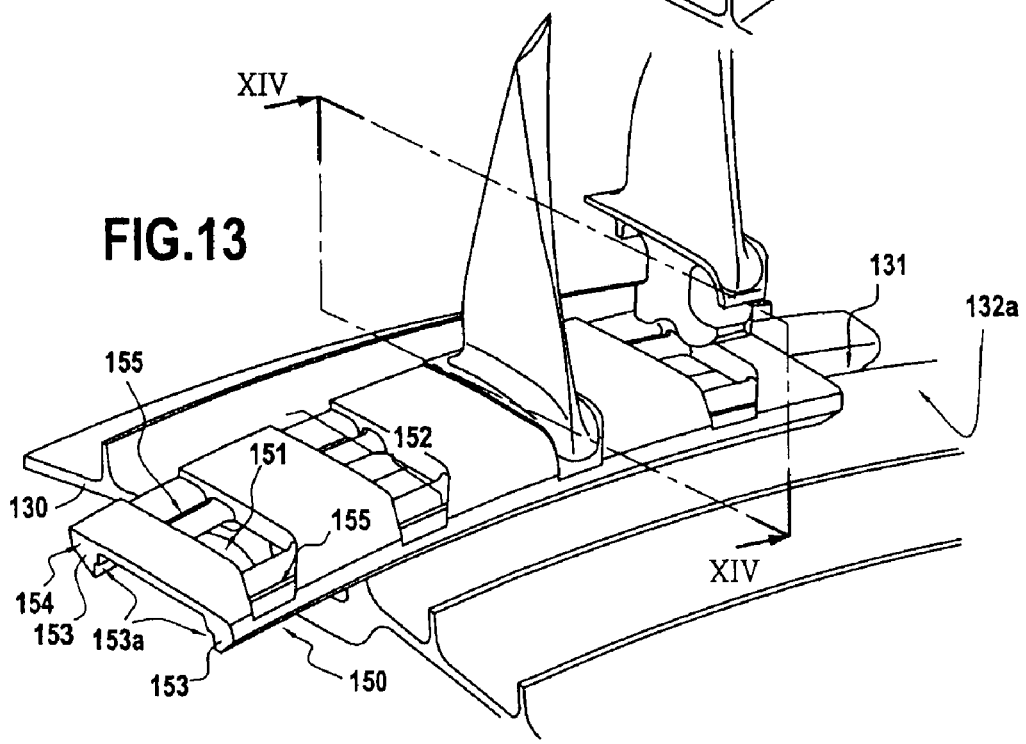

PLATFORM AND BLADE FOR A BLADED WHEEL OF A TURBOMACHINE, BLADED WHEEL AND COMPRESSOR OR TURBOMACHINE COMPRISING SUCH A BLADED WHEEL

BACKGROUND OF THE INVENTION

1. Field Of The Invention

The invention relates to a platform for a bladed wheel of a turbomachine comprising a drum and blades of hammer-head attachment type, the foot of which is retained in a circumferential groove of the drum, having bearing and/or retaining faces cooperating with the drum.

The present invention relates in particular but in a non-limiting way to the moving bladed wheels of a low-pressure compressor of a turbomachine.

2. Description Of The Related Art

Normally, these bladed wheels comprise a series of blades, each forming a separate piece having several parts, these blades being fitted directly onto the drum.

Such a blade 20 is shown in FIG. 1, on its own, and in FIGS. 2 to 4 when fitted in a circumferential groove 31 of a drum 30.

In this case, the blade 20 of the prior art that can be seen in FIG. 1 comprises the following parts:

- a vane 21 extending essentially radially and axially and constituting the part that transmits the kinetic energy to the air stream,
- a foot 22 constituting the part that maintains the blade on the rotor by being housed in the drum 30,
- a platform 23 extending essentially axially and circumferentially, constituting the part that delimits and channels the air stream, and situated between the vane 21 and the foot 22, and
- a radius 24 constituting the linking part between the vane 21 and the platform 23 and having an external progressive transition face with concave profile.

After fitting in the circumferential groove 31 of the drum 30 of axis X-X', as can be seen in FIGS. 2 to 4:

- the platforms 23 abut against each other in pairs by their circumferential end face 23a (see FIG. 4), hence the blades 20 are immobilized in the circumferential direction relative to the drum 30 thanks to a lock (not represented) fitted between the row of blades 20 and in a locking notch (not represented) of the circumferential groove 31, and
- the foot 22 and the circumferential groove 31 have opposing bearing faces 22a, 22b and 31a, 31b (see FIG. 3) which cooperate with each other in pairs, hence the blades 20 are immobilized radially and axially relative to the drum 30 (in rotation and under the effect of the centrifugal force, the inclined bearing faces 22a and 31a come into contact).

In this case, an annular catch 25 is arranged on the internal face of the platform 23, on the downstream end (see FIGS. 1, 3 and 4) or on the upstream end of the platform 23. As a variant, both the downstream end and the upstream end of the platform 23 are equipped with a catch 25.

This catch 25 forms an abutment beneath the platform 23 which guarantees, when the motor is stopped and the blades 20 are not centrifuged, that the blade 20 bearing this catch remains in the correct position. In practice, the catch 25 forms by its free end a retaining face bearing against the top face (external face) of one of the lateral walls surrounding the circumferential groove 31: thus, the pivoting of the blade 20 about the foot 22 (about an axis parallel to the perpendicular direction in FIG. 3) is prevented. This catch 25 also serves to ensure the seal-tightness, because it also serves as a bearing surface for the O-ring seal 40 which is housed in an annular ridge 32 of the external face of the drum 30, close to the circumferential groove 31 (see FIG. 3), in order to prevent the recirculation of air below the blade 20.

In the present text, the terms "internal" and "external" designate radial positions respectively close to the axis X-X' and distant from the axis X-X' and the terms "upstream" and "downstream" designate axial positions along the axis X-X', in the direction of the flow of the air stream, which are arranged respectively one in front of the other.

This type of one-piece blade 20 with hammer-head attachment is generally made of a titanium alloy with the application of several technologies: the parts exposed to the air stream, namely the vane 21, the radius 24 and the top face of the platform 23, the result of forging, whereas the other parts, namely the bottom face of the platform 23 and the foot, are obtained on completion of a post-forging machining step.

Because of the one-piece nature of these blades 20, it is not possible to make the different parts of the blade 20 using the methods and materials best suited to the geometrical and operating stresses of each of these parts.

Also known is how to produce blades that comprise a reduced blade platform (reduced circumferential extent) and which are pieces separate from other pieces consisting of individualized inter-blade platforms.

The documents U.S. Pat. No. 6,632,070, US 2007 0020102 and in particular document US 2006 0222502 relate to such a situation.

Thus, in the case of the document US 2006 0222502, a blade, an inter-blade platform, a blade, an inter-blade platform and so on are fitted alternately, in the circumferential groove of the drum. This way, on the one hand the blades with reduced platform and on the other hand the individualized inter-blade platforms can be manufactured separately, and therefore using different techniques and/or materials.

However, because of the larger number of pieces constituting the bladed wheel (practically twice as many), there are more handling operations when assembling (or disassembling) the bladed wheel. Since the play in the circumferential direction must be as small as possible (play to be taken up), the assembly of a larger number of pieces generates longer times and therefore an excess cost, as well as greater risks of error concerning the positioning of the pieces relative to each other and along the series of blades and inter-blade platforms.

Furthermore, with individualized inter-blade platforms, the locking system is more complex because the space generally occupied by the locks is used by the inter-blade platforms, which leads to the use of more complex inter-blade platforms called locking inter-blade platforms.

Furthermore, in this case, there is a risk of generating more air leaks, that is recirculations from the duct delimited by the external face of the platforms to the space situated under the platforms, because of the larger possible number of air passages between the reduced platform of a blade and the adjacent individualized inter-blade platform. To optimize the seal-tightness with individualized inter-blade platforms, it has been proposed to modify the geometry of the blade (or of the inter-blade platform), but these attempts have culminated in very complicated geometries, and would be the cause of major excess costs.

BRIEF SUMMARY OF THE INVENTION

The aim of the present invention is to provide a solution making it possible to overcome the drawbacks of the prior art and in particular offering the possibility of separately manufacturing the platforms and the blades, but without too significantly increasing the number of handling operations when assembling/disassembling and minimizing the risks of recirculation.

To this end, according to the present invention, the platform is characterized in that it has bearing and/or retaining faces capable of cooperating with the drum to retain the platform on the drum, in that it covers an angular segment, and in that it comprises at least two openings spaced apart circumferentially and each able to receive the foot of a blade, whereby it constitutes a multiple-blade platform in the form of a piece separate from the blades.

In this way, it will be understood that, by no longer using individualized inter-blade platforms, but multiple-blade platforms, the number of pieces stacked in the circumferential direction is reduced, so reducing the handling operations when assembling/disassembling.

This solution also offers the additional advantage of making it possible to easily optimize the platform regarding sealtightness, that is, minimize the risks of recirculation.

This solution also offers the advantage of being compatible with a conventional locking system, which is not the case with the individualized inter-blade platform solution.

The present invention also relates to a blade designed to be fitted on a drum by means of a platform of the type defined previously, characterized in that it is made in a single piece and comprises a vane and a foot, between which is formed a reduced platform.

The present invention also relates to a moving bladed wheel comprising blades of hammer-head attachment type and a drum comprising a circumferential groove able to retain the foot of the blades and having an insertion notch, characterized in that it comprises several platforms of the type defined previously, each covering an angular segment of the bladed wheel and retaining several of its blades in the drum.

The present invention also relates to a compressor, in particular a low-pressure compressor, but also, where appropriate, a high-pressure compressor, which comprises a bladed wheel of the type defined previously.

Finally, the present invention relates to a turbomachine, in particular a turbo-jet engine, comprising a bladed wheel of the type defined previously.

BRIEF DESCRIPTION OF THE SEVERAL VIEWS OF THE DRAWINGS

Other advantages and features of the invention will become apparent from reading the following description, given by way of example, and with reference to the appended drawings in which:

FIGS. 11 to 13 are perspective views illustrating the assembly steps between a multiple-blade platform, blades with reduced platform and a drum.

DETAILED DESCRIPTION OF THE INVENTION

Figure 1:
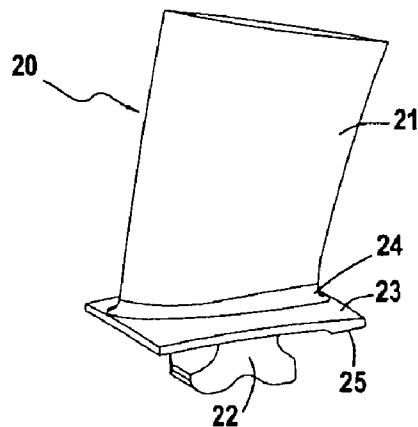
FIG. 1, already described, is a perspective view of a blade according to the state of the art, FIG. 2, already described, is a perspective view of several blades according to FIG. 1, fitted on the drum, FIG. 3, already described, is a projection view in the direction III of FIG. 2, FIG. 4, already described, is a cross-sectional view in the direction IV-IV of FIG. 3.
Figure 2:
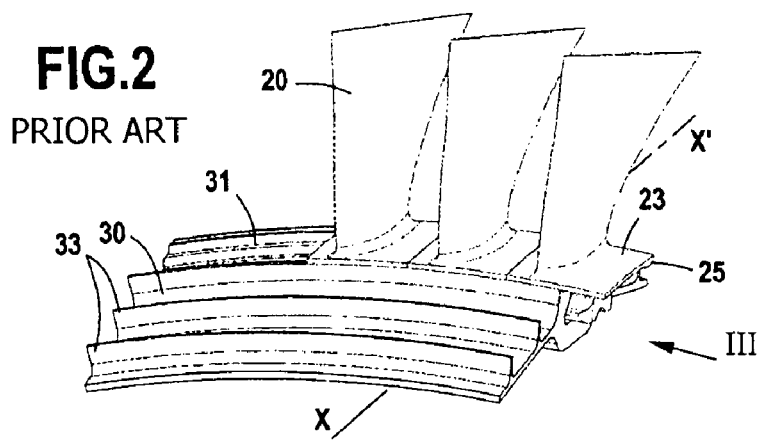
Figure 4:
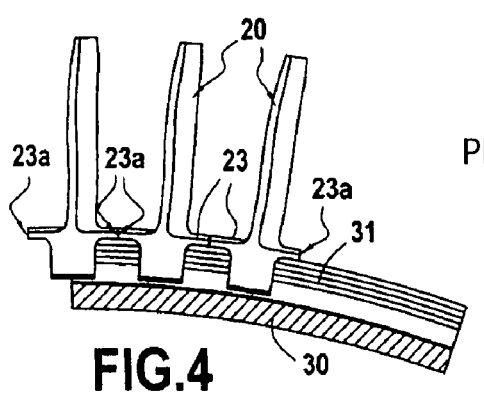
Figure 3:
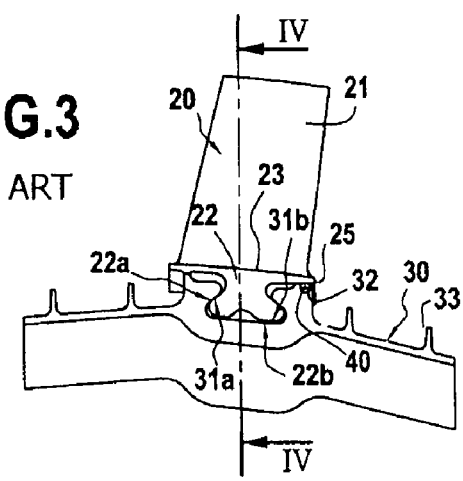
Figure 5:
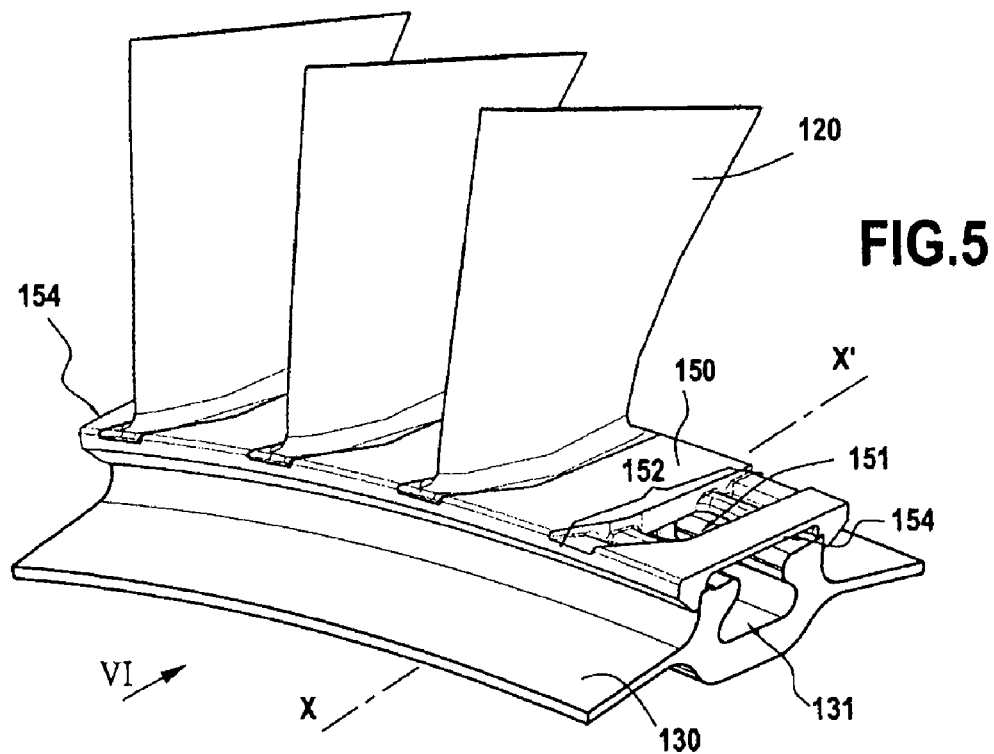
FIG. 5 is a view similar to that of FIG. 2 for a platform according to the invention.
Figures 6, 7, 8:
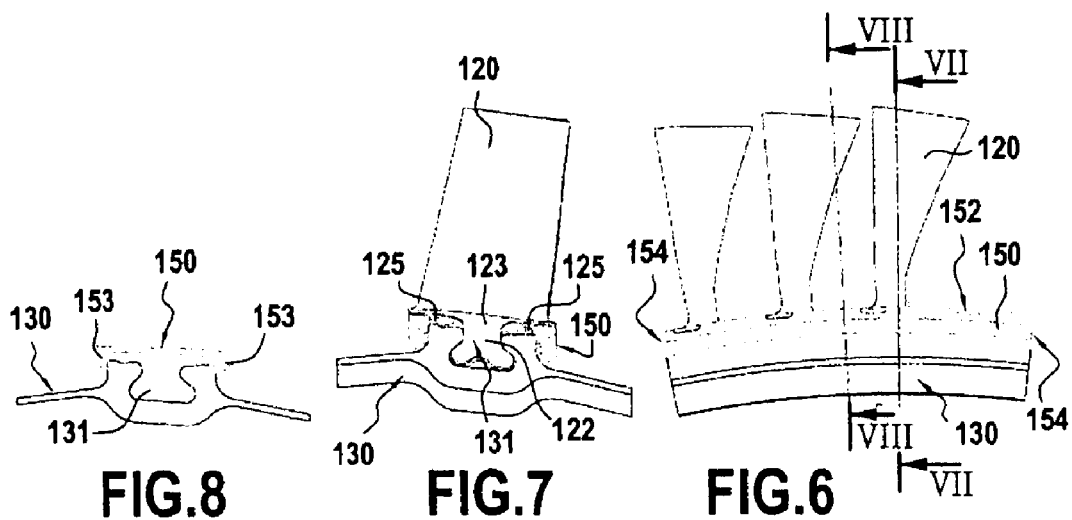
FIG. 6 is a projection view in the direction VI of FIG. 5, FIGS. 7 and 8 are cross-sectional views respectively in the directions VII-VII and VIII-VIII of FIG. 6, FIGS. 9 and 10 are partial perspective views of the multiple-blade platform according to the invention and of the blade with reduced platform according to the invention.

Referring to FIG. 5, the drum 130 is partially represented in a portion corresponding to an angular segment spanning four blades with reduced platform 120 (only three of these four blades 120 are represented in FIG. 5) which are each retained by their foot 122 in a circumferential groove 131 of the drum 130 by means of one multiple-blade platform 150.

To this end, the multiple-blade platform 150 comprises, for each blade 120, an opening 151 opening out into the circumferential groove 131 when the platform 150 is fitted on the drum 130.

The multiple-blade platform 150 also comprises, in the position of each opening 151, a recess 152 opening out onto the external face of the multiple-blade platform 150 and making it possible to receive a reduced blade platform 123. This recess 152 is a cavity extending over the entire length, in the axial direction, of the platform 150, and widthwise, in the circumferential direction, over the same distance as the opening 151 or as the width of the reduced platform 123 of the blade 120, which is itself at most as wide as the foot 122 of the blade 120.

In order to enable the platform 150 to be fitted on the drum, the platform 150 also comprises two stiffeners 153 comprising lateral bearing faces 153a able, on their own, to axially retain the platform 150 on the drum 130 and to reduce air recirculations.

To this end, the two stiffeners 153 constitute internal ribs situated at the two upstream and downstream ends of the platform 150 and the two stiffeners 153 comprise (see FIG. 14) lateral bearing faces 153a designed to cooperate with the bearing faces 132a of the lateral walls 132 of the circumferential groove 131. Preferably, the lateral bearing faces 132a and 153a constitute axial support surfaces, namely surfaces that provide full contact between them, for perfect axial retention between the drum 130 and the platform 150.

In this way, furthermore, a labyrinth seal is formed between the drum 130 and the stiffeners 153, which reduces air recirculations below the platform (internal face), whereby the O-ring seal 40 can be dispensed with.

The platform 150 also comprises (see FIGS. 5, 6, 10, 12 and 13) at each of its two circumferential ends, an inter-platform bearing face 154 able to bear, after the platform 150 has been fitted on the drum 130, against an inter-platform bearing face 154 of the adjacent platform 150.

Figure 9:
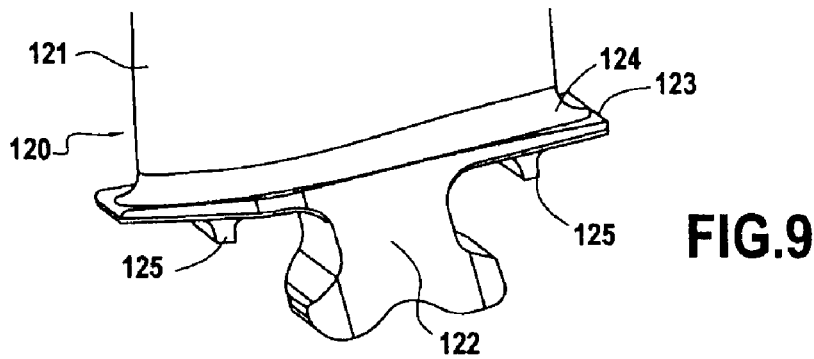
Figure 10:
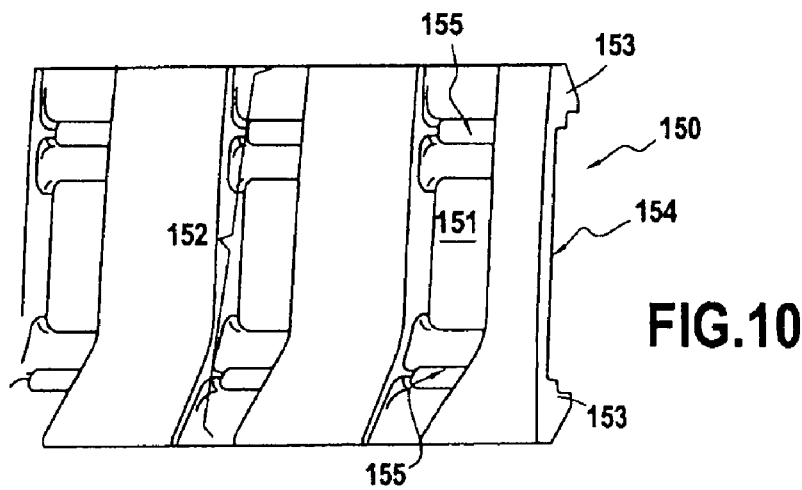
Figure 14:
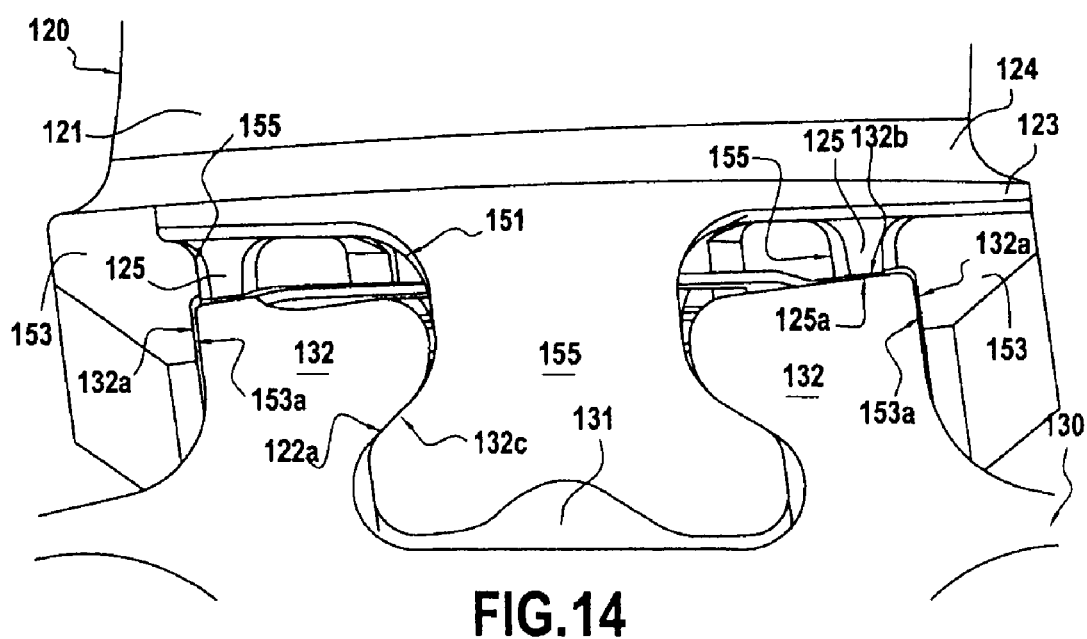
FIG. 14 is an enlarged cross-sectional partial view in the direction XIV-XIV of FIG. 13.

The platform 150 also comprises, either side of each opening 151, in the axial direction, two orifices 155 each enabling the passage of a blade catch 125 (see FIGS. 9, 10 and 14).

Thus, it will be understood that the recess 152 delimits a recessed space, which forms a depression, relative to the external surface of the platform 150, which passes through the entire thickness of the platform 150 only at the positions of the opening 151 and of the orifices 155.

As can be seen in particular in FIGS. 9 and 12, according to the present invention, the blade 120, which is dedicated to the multiple-blade platform 150 according to the present invention, is made in a single piece and comprises a vane 121 and a foot 122, between which is formed a reduced platform 123, the dimensions of which in the axial, circumferential and radial directions precisely correspond respectively to the dimensions in the axial, circumferential and radial directions of the recess 152 in which this reduced platform 123 is able to be inserted.

Thus, recirculations between the reduced platforms 123 and the multi-blade platform 150 are avoided.

Furthermore, provision is made for the top faces of the reduced platforms 123 and of the multi-blade platform 150 to be flush when each reduced platform 123 is arranged in its recess 152, so avoiding any aerodynamic disturbance of the air stream.

The blade 120 with reduced platform 123 also comprises a radius 124 similar to the radius 24 of the blade 20 described previously in relation to the prior art.

Furthermore, the bottom face of the reduced platform 123 has two blade catches 125 arranged axially either side of the foot 122 and oriented towards the foot 122.

These two blade catches 125 pass through the two orifices 155 of the platform 150 to interact with the drum 130. To this end, the free ends of the catches 125 have internal bearing faces 125a (see FIG. 14) which cooperate by resting/bearing against corresponding external bearing faces 132b situated on the internal free end of the lateral walls 132 of the circumferential groove 131 of the drum.

In this way, the catches 125 of the blade 120 interact with the external bearing faces 132b of the drum 130 to radially maintain the platform 150. The orifice 155 is produced and dimensioned so as to allow this interaction between the blade 120 and the drum 130.

This version with two catches 125 is the one that is preferred and that is represented in the figures (see in particular FIGS. 7, 9 and 14), but, according to a variant that is not represented, the reduced platform 123 comprises only a single catch 125. In this case, the multiple-blade platform 150 is either unchanged and one of the two orifices 155 remains vacant after assembly, or the multiple-blade platform 150 comprises only a single orifice 155.

The interaction between the lateral bearing faces 153a of the platform 150 with the lateral bearing faces 132a of the drum 130, guarantees on the one hand the correct axial positioning of the platform 130 in the assembly, and on the other hand that the air recirculations through the bottom of the platform (air leak) will be limited.

It should be noted that the relative position between the foot 122 of each blade 120 and the circumferential groove 131 of the drum remains, in a manner similar to the assembly of the prior art presented in relation to FIGS. 1 to 4, determined in the axial and radial direction by the contact made, on rotation and under the effect of the centrifugal force, between the inclined internal bearing face 132c of the lateral walls 132 of the circumferential groove 131 and the inclined external bearing face 122a of the lateral face of the foot 122.

According to the embodiment described previously and illustrated in the Figures, the multiple-blade platform 150 comprises four openings 151 spaced apart circumferentially and each able to receive a blade 120. In this respect, and according to the present invention, the multiple-blade platform 150 spans an angular segment of several blades 120, which means that the multiple-blade platform 150 can be produced according to several variants in order to receive two, three or more blades 120 by means of as many openings 151 which are each associated with the recess 152 and with the two orifices 155.

The multiple-blade platform 150 is preferably made of a light metal alloy or of a composite material comprising a thermoplastic matrix and fibres, preferably short fibres, but long fibres can be used.

For example, the thermoplastic matrix is of the PEI (Polyetherimide) or PEEK (polyetheretherketone) type and the fibres comprise carbon or glass fibres.

Alternatively, provision can also be made for the multiple-blade platform 150 to be made of aluminium alloy.

The drum 130 can be the same as the drum 30 of the prior art. However, because, according to the invention, the platform 150 is separate from the blades 120 and can therefore be made, as indicated previously, of a lighter material than the material forming the blades 120 (generally titanium), it is possible to thin the drum 130 which is subject to reduced forces.

Thus, it will be understood that, thanks to the invention, the blade 120 with reduced platform is obtained from a "forging" of reduced size compared to that needed to obtain the blade 20 according to the prior art.

Furthermore, thanks to the invention, a lightening of the weight of the assembly consisting of the blades 120 and of the multiple-blade platforms 150, and therefore of the rotor (or bladed wheel) when this assembly is fitted on the drum 130, is obtained.

In relation to FIGS. 11 to 13, there now follows an explanation of the fitting between each platform 150, the drum 130 and the blades 120.

The multiple-blade platform 150 must first be placed on the drum 130 by sliding between the lateral bearing faces 153a of the stiffeners 153 and the lateral bearing faces 132a of the lateral walls 132 of the circumferential groove 131 of the drum 130 (see FIG. 13). In this step, an opening 151 of the multiple-blade platform 150 is placed (see FIG. 11) opposite an insertion notch 133 forming a single hollow into the bottom of the circumferential groove 131 of the drum 130.

Secondly, the foot 122 of a first blade 120 is inserted into the opening 151 positioned facing the insertion notch 133, before the entire foot 122 is placed in the circumferential groove 131.

In this step, the catches 125 are positioned automatically in the corresponding orifices 155 (see FIG. 14).

Thirdly, the multiple-blade platform 150 is displaced circumferentially on the drum 130 by sliding between the lateral bearing faces 153a of the stiffeners 153 and the lateral bearing faces 132a of the lateral walls 132 of the circumferential groove 131 of the drum 130, so as to place the next opening 151 facing the insertion notch 133, in order to enable the next blade to be fitted into the multiple-blade platform 150.

In this step, the first blade 120 is locked in position, because, with the latter no longer facing the insertion notch 133, its foot 122 can no longer exit from the circumferential groove 131 and the immobilizing position of FIG. 14 is obtained.

When all the blades 120 of the angular segment corresponding to the circumferential length of the multiple-blade platform 150 are fitted in this way, the next multiple-blade platform 150 and its corresponding blades 120 are fitted, and so on.

When all the multiple-blade platforms 150 and all the blades 120 have been fitted, as in the prior art, the whole is locked by the fitting of two locks (not represented) in and either side of the insertion notch 133.

It will be understood that the platform 150 positions the blades 120 circumferentially on the drum 130.

Thanks to the multiple-blade platform 150, the assembly phases (or, in the reverse direction, disassembling phases) are easy, reliable and rapid.

Thus, it will be understood that the presence of a multiple-blade platform 150 improves the delimiting of the artery in which the air stream passing through the moving wheel circulates, while minimizing air recirculations.

According to the present invention, the platform 150 is fitted on the drum 130, solely by the bearing and/or retaining faces, and without additional fixing means such as screws and bolts or welding (no drilling is required on the drum, the platform or the foot of the blades).

The invention claimed is:

1. A platform for a bladed wheel of a turbomachine comprising a drum and blades of hammer-head attachment type, a foot of each of the blades is retained in a circumferential groove of the drum, the platform comprising:
   at least two openings spaced apart circumferentially and each able to receive the foot of a blade;
   a first stiffener provided at a first axial end of the platform and a second stiffener provided at a second axial end of the platform, the first stiffener including a first lateral bearing face extending radially inward and abutting an upstream lateral wall of the circumferential groove and the second stiffener including a second lateral bearing face extending radially inward and abutting a downstream lateral wall of the circumferential groove; and
   a first inter-platform bearing face provided at a first circumferential end of the platform and a second inter-platform bearing face provided at a second circumferential end of the platform, the first inter-platform bearing face cooperating with a second inter-platform bearing face of an adjacent platform,
   wherein the platform constitutes a multiple-blade platform in the form of a piece separate from the blades.

2. The platform according to claim 1, wherein said platform further comprises, in a position of each opening, a recess opening out onto an external face of said platform which receives a reduced blade platform.

3. The platform according to claim 1, wherein said platform further comprises, at both sides of each opening, in an axial direction, two orifices each enabling passage of a blade catch.

4. The platform according to claim 1, wherein said platform comprises four openings spaced apart circumferentially and each able to receive a blade.

5. The platform according to claim 1, wherein said platform is made of a light metal alloy or of a composite material comprising a thermoplastic matrix and fibres.

6. The platform according to claim 1, wherein a labyrinth seal is formed between the drum and the first and second stiffeners.

7. The platform according to claim 2, wherein the recess is a cavity extending over an entire length of the platform in an axial direction.

8. A blade designed to be fitted on a drum by a platform according to claim 1, wherein said blade is made in a single piece and comprises a vane and a foot, between which is formed a reduced platform wherein the bottom face of the reduced platform has two blade catches arranged axially either side of the foot and oriented towards the foot.

9. A moving bladed wheel comprising:
   blades of hammer-head attachment type;
   a drum comprising a circumferential groove able to retain the foot of the blades and having an insertion notch; and
   several platforms according to claim 1, each covering an angular segment of the bladed wheel and retaining several blades in the drum.

10. A compressor comprising at least one bladed wheel according to claim 9.

11. A turbomachine comprising at least one bladed wheel according to claim 10.

* * * * *